(12) United States Patent
Watson et al.

(10) Patent No.: US 7,441,017 B2
(45) Date of Patent: Oct. 21, 2008

(54) SYSTEM AND METHOD FOR ROUTER VIRTUAL NETWORKING

(76) Inventors: Thomas Lee Watson, 3312 Meadow Wood Dr., Richardson, TX (US) 75082-3788; Lance Arnold Visser, 7825 McCallum Blvd., #1613, Dallas, TX (US) 75252

( * ) Notice: Subject to any disclaimer, the term of this patent is extended or adjusted under 35 U.S.C. 154(b) by 972 days.

(21) Appl. No.: 09/896,228

(22) Filed: Jun. 29, 2001

(65) Prior Publication Data

US 2003/0051048 A1   Mar. 13, 2003

(51) Int. Cl.
*G06F 15/177* (2006.01)

(52) U.S. Cl. .................. 709/220; 709/215

(58) Field of Classification Search .......... 709/203, 709/215, 220, 222, 224; 711/6, 153; 370/400–401
See application file for complete search history.

(56) References Cited

U.S. PATENT DOCUMENTS

| | | | | |
|---|---|---|---|---|
| 5,159,592 A | * | 10/1992 | Perkins | 370/338 |
| 5,278,986 A | * | 1/1994 | Jourdenais et al. | 717/149 |
| 5,550,816 A | | 8/1996 | Hardwick et al. | |
| 5,878,232 A | * | 3/1999 | Marimuthu | 709/249 |
| 5,970,232 A | * | 10/1999 | Passint et al. | 709/238 |
| 6,282,678 B1 | * | 8/2001 | Snay et al. | 714/712 |
| 6,374,292 B1 | * | 4/2002 | Srivastava et al. | 709/206 |
| 6,570,875 B1 | * | 5/2003 | Hegde | 370/389 |
| 6,587,469 B1 | * | 7/2003 | Bragg | 370/401 |
| 6,597,699 B1 | * | 7/2003 | Ayres | 370/400 |
| 6,633,916 B2 | * | 10/2003 | Kauffman | 709/229 |
| 6,674,756 B1 | * | 1/2004 | Rao et al. | 370/395.21 |
| 6,691,146 B1 | * | 2/2004 | Armstrong et al. | 718/100 |
| 7,039,720 B2 | * | 5/2006 | Alfieri et al. | 709/242 |
| 2002/0035641 A1 | * | 3/2002 | Kurose et al. | 709/241 |
| 2002/0129166 A1 | * | 9/2002 | Baxter et al. | 709/246 |

FOREIGN PATENT DOCUMENTS

EP   0 926 859 A   6/1999

OTHER PUBLICATIONS

Wolf T. et al., "Design Issues for High-Performance Active Routers," IEEE Journal on Selected Areas in Communications, IEEE Inc. New York, US, vol. 19, No. 3, pp. 404-409, Mar. 2001.

(Continued)

*Primary Examiner*—Patrice Winder
*Assistant Examiner*—Benjamin Ailes

(57) ABSTRACT

A host router is logically partitioned into virtual router domains that manage independent processes and routing application copies but share a common operating system. Each v-net manages an independent set of sockets and host router interfaces, each associated with only one v-net at one time, but interchangeably repartitionable Traffic is removed from an interface during repartitioning. Duplicate arrays of global variables copied to each v-net are accessed by macro references. A v-net facility can separate route tables used internally from the externally visible route tables and can avoid conflicts between internal and external IP addresses that share the same identifier. For example a common FreeBSD operating system supports a dynamic routing protocol (DRP) application. Each v-net runs an independent copy of the DRP software and is logically independent. A failure in one DRP copy does not adversely affect other copies.

52 Claims, 1 Drawing Sheet

OTHER PUBLICATIONS

European Search Report dated Mar. 18, 2003 in counterpart application EP 02 25 4403.

U.S. Appl. No. 09/703,057, filed Oct. 31, 2000, Tony M. Brewer.

TCP/IP Illustrated, vol. 2: The Implementation, Gary R. Wright and W. Richard Stevens, Addison-Wesley 1995, p. 64, 97, 128, 158, 186, 207, 248, 277, 305, 340, 383, 398, 437, 476, 572, 680, 715, 756, 797, 1028, and 1051.

* cited by examiner

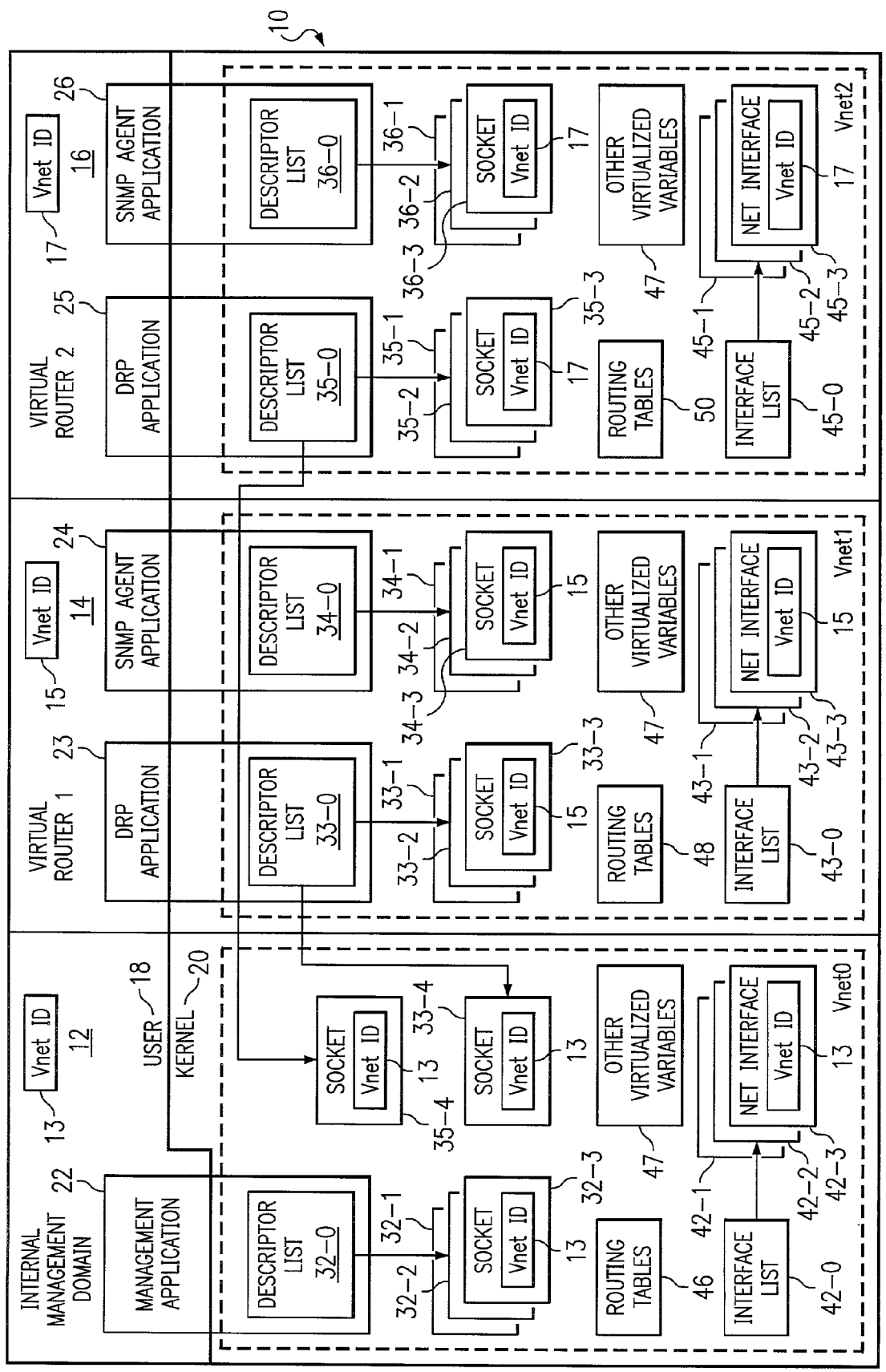

SYSTEM AND METHOD FOR ROUTER VIRTUAL NETWORKING

TECHNICAL FIELD

This application relates to the field of communication networks, and particularly to large-scale routers for optical communication networks.

BACKGROUND

Transmission Control Protocol (TCP) is an underlying connection protocol that is typically used for all types of network communication. A route is essentially the mapping of an IP address to an egress port of a router. Different network routers set up connections with their peer routers using operating systems, for example Border Gateway Protocol (BGP) over TCP or OSPF (Open Shortest Path First) over Internet Protocol (IP) to determine that they get route information from their peers, allowing them to construct essentially an internal map of the network and to select the route that they should use, as well as verification that their peers are operating correctly. This is accomplished by sending various keep-alive packets back and forth to make sure that their peers are still correctly functioning. Routes are used internally within a router, for example a Master Control Processor (MCP) communicates through an Ethernet control network (CNET) within a router with the shelf control processors, each of which have individual IP addresses. Processes including routing applications, for example Dynamic Routing Protocol (DRP), run on these operating systems. Sockets are end points of communication associated with a process. A particular process can have more than one socket.

In a router with a large number of ports, for example 320 ports, that communicates with peer routers, it is advantageous to subdivide that single large router logically into several smaller virtual routers, each of which can be individually configured. There can be separate departments in a large company, or an Internet provider wanting to partition a large router among clients, for example for security reasons. However, previous implementations of subdividing routers having large numbers of ports have been cumbersome.

SUMMARY OF THE INVENTION

The present invention is directed to a system and method which logically partition a host router into virtual router domains that run independent processes and routing application copies but share a common operating system. Each v-net domain manages an independent set of interface ports. Each process manages an independent set of sockets.

In some embodiments a v-net domain architecture is used to partition a host router. Some v-net domains support virtual routers, whereas other v-net domains support only internal router processes and management applications. Thus, not every v-net domain supports a virtual router. A single v-net domain can support more than one process. A v-net facility can advantageously separate route tables used internally from the externally visible routes, making network management easier and more transparent. With separate v-net domains for example, the IP address of an internal shelf control processor does not conflict with the same IP address that is assigned elsewhere on the Internet. In a v-net implementation, duplicate arrays of global variables are instantiated in each virtual router domain and are accessed by macro references.

A common FreeBSD operating system running on the MCP supports a dynamic routing protocol (DRP) application. Each new virtual router is independently managed by its own copy of the DRP application for as many virtual routers as exist. If something goes awry in one DRP copy, it does not affect other copies. Each v-net domain manages a separate set of the interfaces associated with the host router, which provide connections to peer routers. For example, if a host router has 320 ports, one v-net domain can manage 120 ports or interfaces, and another v-net domain can manage another 120 ports. All of these ports and interfaces can be interchangeably partitioned. For each Synchronous Optical Network (SONET) port on a line card, there is an interface (IF) data structure in FreeBSD that represents that SONET port. Any interface can be associated with only one v-net at one time, but can be moved among v-nets to reconfigure the host router. Traffic is removed from an interface while it is being moved. At a high level the host router is partitioned, and each partition normally is managed by an independent copy of the DRP software. In an administrative sense, each of these partitions is logically independent.

Certain activities are still managed across the entire host router, for example failure reporting of hardware in the host router, which is machine specific, and therefore is a resource shared by all of the partitions.

This partitioning also allows the routes between the individual components such as the line cards and processors internal to a router to be contained in route tables separate from externally visible routes. Partitioning the router also facilitates testing, such that one partition might be used for normal network traffic and another might be used to test for example new software or new network configurations for new types of protocols. Additionally, a degree of redundancy is achieved, such that failure of one partition generally does not adversely affect another partition sharing the same host router.

Various aspects of the invention are described in co-pending and commonly assigned U.S. application Ser. No. 09/703,057, entitled "System And Method For IP Router With an Optical Core," filed Oct. 31, 2000, the disclosure of which has been incorporated herein by reference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 1 is a logical diagram illustrating the principles of router virtual networking, according to an embodiment of the present invention.

DETAILED DESCRIPTION

In embodiments of the present invention, a host network router is logically partitioned into multiple virtual networking domains sharing a common operating system. FIG. 1 is a logical diagram illustrating the principles of router virtual networking, according to an embodiment of the present invention. In the implementation of FIG. 1, a host router 10 is logically partitioned into v-net domains 12, 14, and 16 that are associated with networking systems. Each v-net 12, 14, 16 has a unique v-net ID address 13, 15, 17, in accordance with network protocols. Host router 10 and each of v-nets 12, 14, 16 are further logically subdivided into two spaces, shown in FIG. 1 separated horizontally by a solid line, namely a user level 18 and a kernel level 20 of the shared common operating system (OS), for example a version of FreeBSD. The present FreeBSD operating system runs on the host router Master Control Processor (MCP), described for example in U.S. application Ser. No. 09/703,057, entitled "System And Method For IP Router With an Optical Core," filed Oct. 31, 2000, cited above, the disclosure of which has been incorporated herein by reference, and the dynamic routing protocol (DRP) application software runs on top of FreeBSD.

An operating system contains within it logical notions called processes 22-26, for example Internet Management Application 22, DRP 23, 25, or Simple Network Management Protocol (SNMP) agent application 24, 26, running on v-nets 12, 14, and 16. Different individual v-nets can manage the same, different, single, or multiple processes. V-net domains 14 and 16, each running DRP and SNMP processes, are virtual routers, whereas v-net domain 12, running only an internal management application, is not a virtual router. The present FreeBSD operating system supports multiple processes, among which are DRP 23, 25, SNMP 24, 26, and Internal Management Application 22. Each process occupies some user level space 18 and also some operating system kernel level space 20. User level space 18 includes the application and the values of all the application variables (not shown in FIG. 1), whereas OS or kernel level space 20 of the process includes internal data that the kernel maintains with each process. Typical examples of internal kernel data include descriptors or descriptions of open files and the ID of the user that owns the process, attributes that are added to each process associated with a particular v-net.

Among other things associated with a particular v-net are interfaces, for example interfaces 42-1 through 42-3 associated with v-net 12. An interface represents for example a particular physical hardware Ethernet card, gigabit Ethernet card, or SONET line card interconnected with a remote router. This allows partitioning of host router interfaces, such that for example interfaces 42-1 through 42-3 contain v-net ID 13 of v-net 12 with which they are associated. V-net domain 12 maintains an interface list 42-0 pointing to interfaces 42-1 through 42-3. Similarly v-net domain 14 maintains an interface list 43-0 pointing to interfaces 43-1 through 43-3 carrying v-net ID 15 of v-net domain 14, and v-net domain 16 maintains an interface list 45-0 pointing to interfaces 45-1 through 45-3 carrying v-net ID 17 of v-net domain 16.

Each process 22-26 can create sockets, which are end points of communication associated with a process, for example sockets 32-1 through 32-3 associated with process 22 in v-net domain 12. A particular process can have more than one socket. Each socket has a v-net ID associated with it, for example sockets 32-1 through 32-3 each contain v-net ID 13 of v-net 12. In v-net 12, management application 22 maintains a descriptor table, for example file descriptor table 32-0 of v-net 12, holding references to sockets 32-1 through 32-3 and to files, which are each associated with specific application 22. Similarly, in v-net 14, DRP application 23 maintains descriptor table 33-0, holding references to sockets 33-1 through 33-3 and to files associated with application 23, and SNMP application 24 maintains descriptor table 34-0 holding references to sockets 34-1 through 34-3 and to files associated with application 24. Likewise in v-net 16, DRP application 25 maintains descriptor table 35-0, holding references to sockets 35-1 through 35-3 and to files associated with application 25, and SNMP application 26 maintains descriptor table 36-0 holding references to sockets 36-1 through 36-3 and to files associated with application 26.

Sockets are partitioned basically according to the domain in which communication takes place. Each of the things done to the socket is interpreted in the context of the particular v-net in which the socket is created, and therefore the socket carries that particular v-net identifier. The process has a v-net identifier, because when a process creates a new socket, which it is able to do, each socket that it creates is then created in a process of that v-net identifier. For example, if a process is associated with v-net 0 creates a socket, then that socket is automatically associated with v-net 0, gets its routing tables from v-net 0, and can then use all of the interfaces that are assigned to v-net 0. A process can, however, change its v-net identifier and thereby its v-net association, for example by moving logically from v-net 0 to v-net 1, and can then create a new socket associated with v-net 1, which uses routing tables and interfaces of v-net 1, which are disjoint with the interfaces for v-net 0.

Once a socket is created, it cannot be moved to another v-net, but remains in the domain in which it was created. However, a process, by changing its v-net identifier, can then create sockets in multiple domains. Consequently, a process can essentially communicate across domains by creating a socket in each one, but each socket, throughout its existence, is fixed in its original domain. Multiple sockets created by a process are distinctly different from a single socket that is simply interpreted in different ways. For example a single process can create ten distinct sockets in one domain and five distinct sockets in another domain. For example, socket 35-4 is created in v-net domain 12 by DRP application 25 and carries v-net ID 13, although socket 35-4 is referenced in descriptor list 35-0 of DRP application 25, which is now in v-net domain 16. Likewise, socket 33-4 is created in v-net domain 12 by DRP application 23 and thus carries v-net ID 13, although socket 33-4 is referenced in descriptor list 33-0, which is now in v-net domain 14. A socket is destroyed when a process exits or when a process closes down the communication end point represented by that socket. After a socket is destroyed, it is no longer associated with any domain, and the memory associated with it is freed.

If for example v-net 14 and v-net 16 are two networking domains of host router 10, and if v-net 14 is a production network carrying live traffic with production code in it, or production network connections carrying real customer traffic, then a socket associated with v-net 14 is operating in that v-net's space and has routing tables 48 for that v-net to route live traffic. Consequently, if the socket were to select a particular IP address, that IP address would use production routing tables 48. A different socket in a different v-net 16 is for example used for a small test bed and contains a different set of routing tables 50. Accordingly, when a message is sent on v-net 16 with an IP address, that IP address is interpreted in the context of v-net 16 running the small test bed.

Global variables are variables that are accessible to all the various logical contexts or threads of execution that are running concurrently within an operating system. Thus a global variable is not on the stack of a particular thread. Accordingly, all global variables are available to every process that is running within the operating system. Global variables include at least at the top level, for example, the IP address of a machine or a copy of the routing tables so that a process knows where to send packets. There are a certain set of global variables associated with the networking code, and in order to make the networking codes support partitioning, the set of global variables associated with networking are replicated, one copy 47 for each v-net domain, such that the operating system effectively contains, rather than one copy of the networking data structures, N instantionations of the networking stack, replicating all the various functions of the networking code, including replicated routing tables and replicated TCP control blocks linked together throughout the basic data structure. Thus, effectively all of the important variables in the networking system are replicated, so that they can be independently managed. This can be thought of as an operating system with N instantiations of the networking system.

The basic approach of the v-net code is to take global variables that need to be replicated for each v-net domain, and to make an array of them. As an example tcpstat, the tcp statistics structure, is declared in tcp_var.h struct tcpstat { . . . } and defined in tcp_input.c as struct tcpstat tcpstat. To have a separate set of statistics for each v-net domain requires changing the definition to struct tcpstat tcpstat[NVNET] and changing all references to index by the appropriate v-net domain number.

To make v-net facility a configuration option, the declarations and references are encapsulated in macros. The macros generate arrays when v-nets are configured in and scalars when v-nets are deconfigured. As an example the tcpstat declaration becomes VDECL (struct tcpstat, tcpstaT), in which the first macro argument is the type, and the second macro argument is the name. It will be noted that the variable name is changed from tcpstat to tcpstaT. This convention is followed throughout the global variable generation, i.e., variables that are virtualized and global across more than one file are changed to have the final letter in their name capitalized. This is done for three reasons:

1) to differentiate global variables from local variables and/or types of the same name for readability,
2) to ensure that all references to global variables are fixed appropriately (by causing a compile error if the variable name is not changed); and
3) to denote global variables plainly for possible future changes.

References to virtualized variables are made using one of two macros, _v(name), or _V(name, index), where name is the variable name and index is the v-net domain index to be used. The macro _v uses a per CPU global index variable vnetindex. It will be noted that all references to virtualized variables must be made with these macros, without exception, so that the references are correct without requiring #ifdef's when v-nets are configured or deconfigured.

In addition to defining a methodology that handles virtualization of variables, a selection is needed of the correct set of global variables to be replicated for each v-net domain, and the replicated variables need to be correctly referenced by macros in the appropriate v-net domain. For example, global variables can be identified by using a script that analyzes object (_o) files for the global variables they define, by code inspection, or by information from other sources (see for example the tables of global variables in *TCP/IP Illustrated, Volume 2: The Implementation*, Gary R. Wright and W. Richard Stevens, Addison-Wesley 1995, p. 64, 97, 128, 158, 186, 207, 248, 277, 305, 340, 383, 398, 437, 476, 572, 680, 715, 756, 797, 1028, and 1051).

The following Appendix A is basically a table of the global variables that are virtualized in some implementations, listing the name and the purpose of the variable. The variables that are virtualized are generally marked "virtualized" in the table. Although virtualized variables shown in the table are usually marked "virtualized," other variables in the table have been analyzed but excluded from virtualization. All of the "virtualized" variables are essentially replicated, such that each v-net maintains its own set of these variables. Then macros, program conventions that allow textural substitution, are provided, such that everywhere a global variable is accessed, a replacement access is a macro reference selected from the correct set of variables based on the correct v-net.

In the present embodiment, multiple networking domains are implemented by the same operating system, unlike previous approaches, in which for example a computer is subdivided into virtual domains that partition the hardware and run separate operating systems in each domain.

APPENDIX A

VARIABLE ANALYSIS

| Variable | Data Type | Defining File | Description | Analysis/ Disposition |
|---|---|---|---|---|
| Head | static struct router_info* | igmp.c | Head of router_info linked list. | Virtualized. |
| Addmask_key | static char* | radix.c | Temporary storage for m_addmask. | Invariant. |
| arp_allocated | static int | if_ether.c | Total number of llinfo_arp structures allocated. | Virtualized. |
| arp_inuse | static int | if_ether.c | Current number of llinfo_arp structures in use. | Virtualized. |
| arp_maxtries | static int | if_ether.c | Tunable. Maximum number of retries for an arp request. | Tunable. Not virtualized. |
| arp_proxyall | static int | if_ether.c | Tunable. Enables forming a proxy for all arp requests. | Tunable. Not virtualized. |

APPENDIX A-continued

VARIABLE ANALYSIS

| Variable | Data Type | Defining File | Description | Analysis/ Disposition |
|---|---|---|---|---|
| arpinit_done | static int | if_ether.c | Indicates initialization is done. | Invariant. Initialization handles all vnets. |
| arpintrq | struct ifqueue | if_ether.c | Arp interrupt request queue. Shared by all vnets. Vnet switching when pulled off queue. | Invariant. |
| arpt_down | static int | it_ether.c | Tunable. No. of seconds between ARP flooding algorithm. | Tunable. Not virtualized. |
| arpt_keep | static int | it_ether.c | Tunable. No. seconds ARP entry valid once resolved. | Tunable. Not virtualized. |
| arpt_prune | static int | it_ether.c | Tunable. No. seconds between checking ARP list. | Tunable. Not virtualized. |
| bpf_bufsize | static int | bpf.c | Tunable. | Tunable. Not virtualized. |
| bpf_cdevsw | static struct cdevsw | bpf.c | Table of entry point function pointers. | Invariant. |
| bpf_devsw_installed | static int | bpf.c | Initialization flag. | Invariant. |
| bpf_dtab | static struct bpf_d (NBPFILTER) | bpf.c | Descriptor structure, one per open bpf device. | Invariant. |
| bpf_dtab_init | static int | bpf.c | Another initialization flag. | Invariant. |
| bpf_iflist | static struct bpf_if | bpf.c | Descriptor associated with each attached hardware interface. | Invariant. |
| clns_recvspace | static u_long | raw_clns.c | Constant (patchable). Amount of receive space to reserve in socket. | Not virtualized. |
| clns_sendspace | static u_long | raw_clns.c | Constant (patchable). Amount of send space to reserve in socket. | Not virtualized. |
| clns_usrreqs | struct pr_usrreqs | raw_clns.c | Function pointers for clns user requests. | Invariant. |
| clnsg | struct clnsglob | raw_clns.c | Global state associated with ray_clns.c, including list heads and counters. | Virtualized. |
| clnsintrq | struct ifqueue | raw_clns.c | Clns interrupt request queue. Shared by all vnets. Vnet switching done when removed from queue. | Invariant. |
| clnssw | struct protosw | raw_clns.c | Pointers to protocol entry points & associated data. | Invariant. |
| counter | static u_int64_t | ip_fw.c | Counter for ipfw_report. | Virtualized. |
| div_recvspace | static u_long | ip_divert.c | Amount of receive space to reserve in socket. | Invariant. |
| div_sendspace | static u_long | ip_divert.c | Amount of send space to reserve in socket | Invariant. |
| divcb | static struct inpcbhead | ip_divert.c | Head of inpcb structures for divert processing. | Virtualized. |
| divcbinfo | static struct inpcbinfo | ip_divert, c | Pcbinfo structure for divert processing | Virtualized. |
| dst | static struct sockaddr | bpf.c | Sockaddr prototype. | Invariant. |
| err_prefix | char[] | ip_fw.c | Constant string for printfs. | Invariant. |
| etherbroadcastaddr | u_char [6] | if_ethersubr.c | Constant. Ethernet broadcast link address. | Invariant. |
| expire_upcalls_ch | static struct callout_handle | ip_mroute.c | Callout handle for expire_upcalls. | Virtualized. |
| fcstab | static u_short [256] | ppp_tty.c | Constant. Table for FCS lookup. | Invariant. |
| frag_divert_port | static u_short | ip_input.c | Divert protocol port. Conditionally compiled iwith IPDIVERT. | ? |
| fw_debug | static int | ip_fw.c | Tunable. Enables debug print. | Not virtualized. |
| fw_one_pass | static int | ip_fw.c | Tunable. Enables accepting packet if passes first test. | Not virtualized. |
| fw_verbose | static int | ip_fw.c | Tunable; controls verbosity of firewall debugging messages. | Not virtualized. |
| fw_verbose_limit | static int | ip_fw.c | Tunable. Limits amount of logging. | Not virtualized. |
| have_encap_tunnel | static int | ip_mroute.c | Indicates presence of an encapsulation tunnel. | Virtualized. |

APPENDIX A-continued

VARIABLE ANALYSIS

| Variable | Data Type | Defining File | Description | Analysis/ Disposition |
| --- | --- | --- | --- | --- |
| icmpbmcastecho | static int | ip_icmp.c | Tunable flag. Disables broadcasting of ICMP echo and timestamp packets. | Not virtualized. |
| icmpdst | static struct sockaddr_in | ip_icmp.c | Saves the source address for ifaof_ifpforaddr. | Virtualized. |
| icmpgw | static struct sockaddr_in | ip_icmp.c | Holds the ip source address in icmp_input. | Virtualized. May not be necessary |
| icmplim | static int | ip_icmp.c | Tunable. ICMP error-response band with limiting sysctl. | Not virtualized. |
| icmpmaskrepl | static int | ip_icmp.c | Tunable flag. Enables ICMP mask replacement. | Not virtualized. |
| icmpprintfs | int | ip_icmp.c | Enables printfs in icmp code. | Not virtualized. |
| icmpsrc | static struct sockaddr_in | ip_icmp.c | Holds the ip dest address in icmp_input. | Virtualized. May not be necessary |
| icmpstat | static struct icmpstat | ip_icmp.c | Icmp statistics. | Virtualized. |
| if_indeX | int | if.c | Number of configured interfaces. | Virtualized. |
| if_indexliM | static int | if.c | Number of entries in ifnet_addrS array. | Virtualized. |
| ifneT | struct ifnethead | if.c | Head of list of ifnet structures. | Virtualized. |
| ifnet_addrS | struct iffaddr** | if.c | Array of pointers to link level interface addresses. | Virtualized. |
| ifqmaxlen | int | if.c | Constant. Maximum queue length for interface queue. | Invariant. |
| igmp_all_hosts_group | static u_long | igmp.c | Host order of INADDR_ALLHOSTS_GROUP constant | Invariant. |
| igmp_all_rtrs_group | static u_long | igmp.c | Host order of INADDR_ALLRTS_GROUP constant. | Invariant. |
| igmp_timers_are_running | static int | igmp.c | Flag indicating any igmp timer is active. | Virtualized. |
| igmprt | static struct route | igmp.c | Temporary variable. | Invariant. |
| igmpstat | static struct igmpstat | igmp.c | Igmp statistics. | Virtualized. |
| in_ifaddrheaD | struct in_ifaddrhead | ip_input.c | Head of in_ifaddr structure list. | Virtualized. |
| in_interfaces | static int | in.c | Incremented each time a non-loopback interface is added to in_ifaddrheaD. Not read. | Invariant. Never read. Dead code. |
| in_multiheaD | struct in_multihead | in.c | Head of list of in_multistructures (multicast address). | Virtualized. |
| inetclerrmap | u_char [] | ip_input.c | Array of constants (error numbers). | Invariant. |
| inetdomain | struct domain | in_proto.c | Pointers to switch table, initialization, etc. for internet domain. | Invariant. |
| inetsw | struct protosw | in_proto.c | Pointers to entry points for various internet protocols. | Invariant. |
| inited | static int | if.c | Flag indicating initialization has been performed. Initialization does all vnets. | Invariant. |
| ip_acceptsourceroute | static int | ip_input.c | Tunable flag. Enables acceptance of source routed packets. | Tunable. Not virtualized. |
| ip_defttl | int | ip_input.c | Tunable. Default time to live from RFC 1340. | Tunable. Not virtualized. |
| ip_divert_cookiE | u_int16_t | ip_divert.c | Cookie passed to user process. | Virtualized. |
| ip_divert_porT | u_short | ip_divert.c | Global "argument" to div_input. Used to avoid changing prototype. | Virtualized. |
| ip_dosourceroute | static int | ip_input.c | Tunable flag. Enables acting as a router. | Tunable. Not virtualized. |
| ip_fw_chaiN | struct ip_fw_head | ip_fw.c | Head of ip firewall chains. | Virtualized. |
| ip_fw_chk_ptr | ip_fw_chk_t* | ip_input.c | IP firewall function callout pointer; value depends on loading fw module. | Invariant. |
| ip_fw_ctl_ptr | ip_fw_ctl_t* | ip_input.c | IP firewall function callout pointer; value depends on loading fw module. | Invariant. |

APPENDIX A-continued

VARIABLE ANALYSIS

| Variable | Data Type | Defining File | Description | Analysis/ Disposition |
|---|---|---|---|---|
| ip_fw_default_rulE | struct ip_fw_chain* | ip_fw.c | Pointer to default rule for firewall processing. | Virtualized. |
| ip_fw_fwd_addR | struct sockaddr_in* | ip_input.c | IP firewall address. | Virtualized. |
| ip_ID | u_short | ip_output.c | IP packet identifier (increments). | Virtualized. |
| ip_mcast_src | ulong (*)(int) | ip_mroute.c | Pointer to function; selection depends on compile options. | Invariant. |
| ip_mforward | int(*)(struct ip*, struct ifnet*, . . . ) | ip_mroute.c | Function pointer set by module installation. | Invariant. |
| ip_mrouteR | struct socket* | ip_mroute.c | Socket of multicast router program. | Virtualized. |
| ip_mrouter_done | int (*)(void) | ip_mroute.c | Function pointer set by module installation. | Invariant. |
| ip_mrouter_get | int (*)(struct socket*, struct sockopt*) | ip_mroute.c | Function pointer selected by compile options. | Invariant. |
| ip_mrouter_set | int (*)(struct socket*, struct sockopt*) | ip_mroute.c | Function pointer selected by compile options. | Invariant. |
| ip_nat_clt_ptr | ip_nat_ctl_t* | ip_input.c | IP firewall function callout hook; set by module install. | Invariant. |
| ip_nat_ptr | ip_nat_t* | ip_input.c | IP firewall function callout hook; set by module install. | Invariant. |
| ip_nhops | static int | ip_input.c | Hop count for previous source route. | Virtualized. |
| ip_protox | u_char [PROTO_MAX] | ip_input.c | Maps protocol numbers to inetsw array. | Invariant. |
| ip_rsvpD | struct socket* | ip_input.c | Pointer to socket used by rsvp daemon. | Virtualized. |
| ip_rsvp_on | static int | ip_input.c | Boolean indicating rsvp is active. | Virtualized. |
| ip_srcrt | struct ip_srcrt | ip_input.c | Previous source route. | Virtualized. |
| ipaddR | struct sockaddr_in | ip_input.c | Holds ip destination address for option processing. | Virtualized. |
| ipflowS | static struct ipflowhead | ip_flow.c | Hash table head for ipflow structs | Virtualized. |
| ipflow_active | static int | ip_flow.c | Tunable. Enables "fast forwarding" flow code. | Invariant. |
| ipflow_inuse | static int | ip_flow.c | Count of active flow structures. | Virtualized. |
| ipforward_rt | static struct route | ip_input.c | Cached route for ip forwarding. | Virtualized. |
| iforwarding | int | ip_input.c | Tunable that enabales ip forwarding. | Virtualized. |
| ipintrq | struct ifqueue | ip_input.c | Ip interrupt request queue for incoming packets. Vnet set when packets dequeued. | Invariant. |
| ipport_firstauto | static int | ip_pcb.c | Bounds on ephemeral ports. | Invariant. |
| ipport_hifirstauto | static int | ip_pcb.c | Bounds on ephemeral ports. | Invariant. |
| ipport_hilastauto | static int | ip_pcb.c | Bounds on ephemeral ports. | Invariant. |
| ipport_lastauto | static int | ip_pcb.c | Bounds on ephemeral ports. | Invariant. |
| ipport_lowfirstauto | static int | ip_pcb.c | Bounds on ephemeral ports. | Invariant. |
| ipport_lowlastauto | static int | ip_pcb.c | Bounds on ephemeral ports. | Invariant. |
| ipprintfs | static int | ip_nput.c | Flag for debug print. | Invariant. |
| ipq | static struct ipq [IPREASS_NHASH] | ip_input.c | Head of ip reassembly hash lists. | Virtualized. |
| ipqmaxlen | static int | ip_input.c | Patchable constant that sets maximum queue length for ipintrq. | Invariant. |
| isendredirects | static int | ip_input.c | Tunable that enable sending redirect messages. | Invariant. |
| istaT | struct ipstat | ip_input.c | Ip statistics counters. | Virtualized. |
| k_igmpsrc | static struct sockaddr_in | ip_mroute.c | Prototype sockaddr_in. | Invariant. |
| last_adjusted_timeout | static int | ip_rmx.c | Time value of last adjusted timeout. | Virtualized. |
| last_encap_src | static u_long | ip_mroute.c | Cache of last encapsulated source address? | Virtualized. |
| last_encap_vif | struct vif* | ip_mroute.c | Last encapsulated volume tag (vif). | Virtualized. |
| last_zeroed | static int | radix.c | Number of bytes zeroed last time in addmask_key. | Invariant. |
| legal_vif_num | int (*)(int) | ip_mroute.c | Pointer to function selected by module installation. | Invariant. |

APPENDIX A-continued

VARIABLE ANALYSIS

| Variable | Data Type | Defining File | Description | Analysis/ Disposition |
|---|---|---|---|---|
| llinfo_arP | struct llinfo_arp_head | if_ether.c | Head of llinfo_arp linked list. | Virtualized. |
| log_in_vain | static int | tcp_input.c udp_usrreq.c | Tunables that enable logging of "in vain" connections. | Invariant. |
| loif | struct ifnet [NLOOP] | if_loop.c | Array of ifnet structs fro loopback device. One per device, therefore invariant. | Invariant. |
| mask_mhead | struct radix_node_head* | radix.c | Head of mask tree. | Invariant. |
| max_keylen | static int | radix.c | Maximum key length of any domain. | Invariant. |
| maxnipq | static int | ip_input.c | Constant (nmbcluslter/4) that is maximum number of ip fragments waiting assembly. Note: should this be scaled by VNET? | Invariant? Scaled? |
| mfctable | static struct mfc* [MFCTBLSIZ] | ip_mroute.c | Head of mfc hash table. | Virtualized. |
| mrt_ioctl | int (*)(int, caddr_t,struct proc*) | ip_mroute.c | Function pointer selected by module initialization. | Invariant. |
| mrtdebug | static u_int | ip_mroute.c | Enables debug log messages. | Invariant. |
| mrtstat | static struct mrtstat | ip_mroute.c | Multicast routing statistics. | Virtualized. |
| mtutab | static int [] | ip_icmp.c | Static table of constants. | Invariant. |
| multicast_decap_if | static struct ifnet [MAXVIFS] | ip_mroute.c | Fake encapsulator interfaces. | Virtualized. |
| multicast_encap_iphdr | static struct ip | ip_mroute.c | Multicast encapsulation header. | Invariant. |
| nexpire | static u_char [MFCTBLSIZ] | ip_mroute.c | Count of number of expired entries in hash table? | Virtualized. |
| nipq | static int | ip_input.c | Number of ip fragment chains awaiting reassembly. | Virtualized. |
| normal_chars | static char [] | radix.c | Static table of mask constants. | Invariant. |
| nousrreqs | static struct pr_usrreqs | in_proto.c ipx_proto.c | Static structure of null function pointers. | Invariant. |
| null_sdl.96 | static struct sockaddr_dl | if_ether.c | Static null sockaddr_dl structure. | Invariant. |
| numvifs | static vifi_t | ip_mroute.c | Number of virtual interface structures. | Virtualized. |
| old_chk_ptr | static ip_fw_chk_t | ip_fw.c | Function pointer holding previous state when module loads. | Invariant. |
| old_ctl_ptr | static ip_fw_ctl_t | ip_fw.c | Function pointer holding previous state when module loads. | Invariant. |
| paritytab | static unsigned [8] | ppp_tty.c | Static array of parity constants. | Invariant. |
| pim_assert | static int | ip_mroute.c | Enables pim assert processing. | Virtualized. |
| ppp_compressors | static struct compressor [8] | if_ppp.c | Static list of known ppp compressors. | Invariant. |
| ppp_softc pppdisc | struct ppp_softc [NPPP] | if_ppp.c | Array of softc structures for ppp driver; one per device. | Invariant. |
| raw_recvspace | static u_long | raw_cb.c | Patchable constant that is amount of receive space to reserve in socket. | Invariant. |
| raw_sendspace | static u_long | raw_cb.c | Patchable constant that is amount of send space to reserve in socket. | Invariant. |
| raw_usrreqs | struct protosw | raw_usrreq.c | Table of function pointers. | Invariant. |
| rawcb_lisT | struct rawcb_list_head | raw_cb.c | Head of rawcb (raw prototocol control blocks) list. | Virtualized. |
| rawclnsdomain | struct domain | raw_clns.c | Table of function pointers. | Invariant. |
| rip_recvspace | static u_long | raw_ip.c | Tunable, amount of receive space to reserve in socket. | Tunable. Not virtualized. |
| rip_sendspace | static u_long | raw_ip.c | Tunable, amount of send space to reserve in socket. | Tunable. Not virtualized. |
| rip_usrreqs | struct pr_usrreqs | raw_ip.c | Table of function pointers. | Invariant. |
| ripcb | static struct inpcbhead | raw_ip.c | Head of raw ip control blocks | Virtualized. |
| ripcbinfo | struct inpcbinfo | raw_ip.c | Pcb info. structure for raw ip. | Virtualized. |
| ripsrc | static struct sockaddr_in | raw_ip.c | Static temporary variable in rip_input | Invariant. |
| m_mkfreelist | static struct radix_mask* | radix.c | Cache of free radix_mask structures. | Invariant. |

APPENDIX A-continued

VARIABLE ANALYSIS

| Variable | Data Type | Defining File | Description | Analysis/ Disposition |
|---|---|---|---|---|
| m_ones | static char* | radix.c | One mask computed from maximum key length. | Invariant. |
| m_zeros | static char* | radix.c | Zeros mask computed from maximum key length. | Invariant. |
| ro | static struct route ro | ip_mroute.c | Temporary variable to hold route. | Invariant. |
| route_cB | struct route_cb | route.c | Counts on the number of routing socket listeners per protocol. | Virtualized. |
| route_dst | static struct sockaddr route | rtsock.c | Null address structure for destination. | Invariant. |
| route_proto | static struct sockproto | rtsock.c | Static prototype of structure used to pass routing info. | Invariant. |
| route_src | static struct sockaddr | rtsock.c | Null address structure for source. | Invariant. |
| route_usrreqs | static struct pr_usrreqs | rtsock.c | Table of function pointers for entry points. | Invariant. |
| routedomain | struct domain | rtsock.c | Table of function pointers for entry points. | Invariant. |
| route_alert | static struct mbuf* | igmp.c | Statically constructed router alert option. | Invariant. |
| routesw | struct protosw | rtsock.c | Table of function pointers for entry points. | Invariant. |
| rsvp_oN | int | ip_input.c | Count of number of open rsvp control sockets. | Virtualized. |
| rsvp_src | static struct sockaddr_in | ip_mroute.c | Sockaddr prototype. | Invariant. |
| rsvpdebug | static u_int | ip_mroute.c | Enables debug print. | Invariant. |
| rt_tableS | struct radix_node_head* [AF_MAX + 1] | route.c | Head of the routing tables (a table per address family.) | Virtualized. |
| rtq_minreallyold | static int | in_rmx.c | Tunable; minimum time for old routes to expire. | Invariant. |
| rtq_reallyold | statinc int | in_rmx.c | Amount of time before old routes expire. | Virtualized. |
| rtq_timeout | static int | in_rmx.c | Patchable constant timeout value for walking the routing tree. | Invariant. |
| rtq_toomany | static int | in_rmx.c | Tunable that represents the number of active routes in the tree. | Invariant. |
| rtstaT | struct rtstat | route.c | Routing statistics structure. | Virtualized. |
| rttrash | static int | route.c | Number of rtentrys not linked to the routing table. Never read, dead code. | Dead code. Not virtualized. |
| sa_zero | struct sockaddr | rtsock.c | Zero address return in error conditions. | Invariant. |
| sin | static struct sockaddr_inarp | if_ether.c if_mroute.c | Sockaddr prototype passed to rtalloc1. | Invariant. |
| sl_softc | static struct sl_soft [NSL] | if_sl.c | Softc structure for slip driver; one per device. | Invariant. |
| slipdisc | static struct linesw | if_sl.c | Table of function pointers to slip entry points. | Invariant. |
| srctun | static int | ip_mroute.c | Counter throttling error message to log. | Invariant. |
| subnetsarelocal | static int | in.c | Tunable flag indicating subnets are local. | Virtualized. |
| tbfdebug | static u_int | ip_mroute.c | Tbf debug level. | Invariant. |
| tbftable | static struct tbf [MAXVIFS] | ip_mroute.c | Token bucket filter structures. | Virtualized. |
| tcB | struct inpcbhead | tcp_input.c | Head structure for tcp pcb structures. | Virtualized. |
| tcbinfO | struct inpcbinfo | tcp_input.c | PCB info structure for tcp. | Virtualized. |
| tcp_backoff | int [] | tcp_timer.c | Table of times for tcp backff | Invariant. |
| tcp_ccgeN | tcp_cc (u_int32_t) | tcp_input.c | Connection count (per rfc 1644). | Virtualized. |
| tcp_delack_enabled | int | tcp_input.c | Tunable that enables delayed acknowledgments. | Tunable. Not virtualized. |
| tcp_do_rfc1323 | static int | tcp_subr.c | Tunable enables rcf 1323 (window scaling and timestamps.) | Tunable. Not virtualized. |
| tcp_do_rfc1644 | static int | tcp_subr.c | Tunable enables rfc 1644. | Tunable. Not virtualized. |

APPENDIX A-continued

VARIABLE ANALYSIS

| Variable | Data Type | Defining File | Description | Analysis/ Disposition |
|---|---|---|---|---|
| tcp_keepcnt | static int | tcp_timer.c | Patchable constant for maximum number of probes before a drop. | Invariant. |
| tcp_keepidle | int | tcp_timer.c | Tunable value for keep alive idle timer. | Tunable. Not virtualized. |
| tcp_keepinit | int | tcp_timer.c | Tunable value for initial connect keep alive. | Tunable. Not virtualized. |
| tcp_maxidle | int | tcp_timer.c | Product of tcp_keepcnt* tcp_keepintvl; recomputed in show timeout. | Invariant. |
| tcp_maxpersistidle | static int | tcp_timer.c | Patchable constant that is default time before probing. | Invariant. |
| tcp_mssdflt | int | tcp_subr.c | Tunable default maximum segment size. | Tunable. Not virtualized. |
| tcp_noW | u_long | tcp_input.c | 500 msec. counter for RFC1323 timestamps. | Virtualized. |
| tcp_outflags | u_char [TCP_NSTATES] | tcp_fsm.h | Static table of flags in tcp_output. | Invariant. |
| tcp_rttdflt | static int | tcp_subr.c | Tunable. Dead code, value not accessed | Invariant. Dead code |
| tcp_sendspace | u_long | tcp_usrreq | Tunable value for amount of send space to reserve on socket. | Tunable. Not virtualized. |
| tcp_totbackoff | static int | tcp_timer.c | Sum of tcp_backoff. | Invariant. |
| tcp_usrreqs | struct pr_usrreqs | tcp_usrreq.c | Table of function pointers for tcp user request functions. | Invariant. |
| tcprexmtthresh | static int | tcp_input.c | Patchable constant; number of duplicate acks to trigger fast retransmit. | Invariant. |
| tcpstaT | struct tcpstat | tcp_input.c | TCP statistics structure. | Virtualized. |
| tun_cdevsw | struct cdevsw | if_tun.c | Table of function pointers for tunnel interface entry points. | Invariant. |
| tun_devsw_installed | static int | if_tun.c | Flag indiating tun devsw table installed. | Invariant. |
| tunctl | static struct tun_softc [NTUN] | if_tun.c | Softc structure for tunnel interface; one per device. | Invariant. |
| tundebug | static int | if_tun.c | Flag enables debut print. | Invariant. |
| udb | static struct inpcbhead | udp_usrreq.c | UDP inpcb head structure. | Virtualized. |
| udbinfo | static struct inpcbinfo | udp_usrreq.c | UDP inpcb info. structure. | Virtualized. |
| udp_in | static struct sockaddr_in | udp_usrreq.c | Prototype sockaddr for AF_INET. | Invariant. |
| udp_recvspace | static u_long | udp_usrreq.c | Tunable; amount of receive space to reserve on socket. | Tunable. Not virtualized. |
| udp_sendspace | static u_long | udp_usrreq.c | Tunable; amount of send space to reserve on socket. | Tunable. Not virtualized. |
| udp_usrreqs | struct pr_usrreqs | udp_usrreq.c | Table of function pointers for entry points. | Invariant. |
| udpcksum | static int | udp_usrreq.c | Tunable; enables udp checksumming. | Tunable. Not virtualized. |
| udpstat | struct udpstat | udp_usrreq.c | Udp statistics structure. | Virtualized. |
| useloopback | static int | it_ether.c | Tunable; enables use of loopback device for localhost. | Tunable. Not virtualized. |
| version | static int | ip_mroute.c | Version number of MRT protocol. | Invariant. |
| viftable | static struct vif [MAXVIFS] | ip_mroute.c | Table of vifs (virtual interface structure). | Virtualized. |
| zeroin_addr | struct in_addr | in_pcb.c | Zero'd internet address. | Invariant. |

NOTE: In the Analysis/Disposition column, "Virtualized" means the variable becomes an array when vnets are configured (see the description above); "Invariant" means a separate instance of the variable is not needed for different vnet domains; and "Not Virtualized" means there was a choice about virtualization (e.g., whether a Tunable could have a different value in different domains), but the choice was made not to virtualize the variable.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system of virtual router domains comprising:
   a host router running a common operating system and a master control processor implemented in virtual networking (v-net) domains capable of separating routing tables used internally from externally visible routes;
   the host router having a capability of running plural independent processes and routing application copies corresponding to the independent process, but sharing said common operating system;
   each of at least a subset of said v-net domains running DRP and SNMP processes, and establishing virtual routers, thereby establishing said v-net domains by ones of said independent processes, the v-net domains logically partitioned into ones of said v-net domains within said host router, each said v-net domain having a unique v-net domain ID address and an independent replica array of all global variables across said common operating system, each said process running in a said v-net domain independently of all other said v-net domains on top of said common operating system; and
   said global variables being accessed by macro references in each said v-net domain.

2. The system of claim 1 wherein said common operating system is a version of FreeBSD.

3. The system of claim 1 wherein said common operating system manages the reporting of hardware failures across all v-net domains of said host router.

4. The system of claim 1 wherein said plurality of processes comprising routing software applications.

5. The system of claim 4 wherein said plurality of processes comprise independent plural identical copies of at least one said process.

6. The system of claim 4 wherein said plurality of processes comprise a copy of a dynamic routing protocol (DRP) software application.

7. The system of claim 1 wherein said plurality of processes comprise a copy of a SNMP application.

8. The system of claim 1 wherein said macros generate an array of said global variables when said v-net domain is configured in.

9. The system of claim 8 wherein said macros generate scalar global variables when said v-net domain is deconfigured.

10. The system of claim 1 further comprising a plurality of interfaces partitioned interchangeably among said v-net domains, such that a particular interface is associated with only one such v-net domain at one time, but can be repartitioned among said v-net domains to reconfigure said host router.

11. The system of claim 10 wherein during said reconfiguring network traffic is removed from said interfaces that are repartitioned.

12. The system of claim 10 wherein said interface contains the unique domain ID address of said v-net domain with which said interface is associated.

13. The system of claim 12 wherein said interface is an interface port of said host router.

14. The system of claim 13 wherein said host router comprises at least 320 said interface ports.

15. The system of claim 13 further comprising a socket created by at least one said process, said socket being associated exclusively with the v-net domain in which it is created and containing said unique domain ID address of said domain in which it is created.

16. The system of claim 15 wherein multiple sockets are created by said at least one process in at least one said v-net domain, such that each of said multiple sockets is associated exclusively with the v-net domain in which said socket is created.

17. The system of claim 16 wherein said at least one process is movable from one said v-net domain to a different said v-net domain, such that said at least one process creates a said socket in each of at least two said v-net domains.

18. The system of claim 16 wherein a particular socket associated with a particular v-net domain is applied exclusively to live traffic networking independently of any other said v-net domain of said host router.

19. The system of claim 16 wherein a particular socket associated with a particular v-net domain is applied exclusively to a test bed operation independently of any other said v-net domain of said host router.

20. The system of claim 15 wherein each of said v-net domains maintains an independent routing table.

21. The system of claim 20 wherein each said socket uses the routing table of said v-net domain in which said socket is created.

22. The system of claim 20 wherein said two distinct v-net domains use the same Internet Protocol (IP) addresses without conflicting.

23. The system of claim 20 wherein one particular v-net domain within said host router contains routing tables exclusively for internal interface addresses within said host router independently of any other said v-net domain of said host router.

24. The system of claim 20 wherein a particular v-net domain within said host router contains routing tables exclusively for interfaces externally visible from outside said host router independently of any other said v-net domain of said host router.

25. The system of claim 20 wherein a failure of one of said plurality of said v-net domains does not adversely affect a different one of said plurality of said v-net domains.

26. A method of logically partitioning a host router into virtual router domains, comprising:
   configuring the kernel of a single common operating system running in said host router implemented in multiple virtual networking (v-net) domains capable of separating route tables used internally from externally visible routes;
   configuring at least one independent process and application copy corresponding to the independent process to run on said host router, in a manner to permit running a plurality of said independent processes and routing application copies corresponding to the independent processes, but sharing said common operating system;
   configuring each of at least a subset of said v-net domains running DRP and SNMP processes, and establishing virtual routers, thereby establishing said v-net domains by ones of said independent processes within said host router;
   identifying each said v-net domain by a unique domain index number;
   generating an independent identical set of replica arrays of global variables for each v-net domain;
   each of at least a subset of said v-net domains running DRP and SNMP processes, and establishing virtual routers, thereby establishing said v-net domains by ones of said independent processes, the v-net domains logically partitioned into ones of said v-net domains within said host router, each said v-net domain having a unique v-net domain ID address and an independent replica array of all global variables across said common operating system, each said process running in a said v-net domain independently of all other said v-net domains on top of said common operating system; and associating a process with each said v-net domain of said host router, such that said processes run in said v-net domains independently of one another on top of said single common operating system of said host router using a master control processor.

27. The method of claim 26 wherein said global variables are generated by macros.

28. The method of claim 27 wherein said macros generate arrays of global variables when said v-net domain is configured in within said host router.

29. The method of claim 28 wherein said macros generate scalar global variables when said v-net domain is deconfigured.

30. The method of claim 26 wherein said single common operating system is a version of FreeBSD.

31. The method of claim 26 wherein said processes comprise routing software applications.

32. The method of claim 31 further comprising independently running plural identical copies of at least one said process.

33. The method of claim 31 wherein said processes comprise a copy of a dynamic routing protocol (DRP) software application.

34. The method of claim 26 wherein each said process manages an instantiation of a common networking code.

35. The method of claim 26 further comprising partitioning a plurality of host router interfaces interchangeably among said v-net domains, such that a particular interface is associated with only one such v-net domain at one time.

36. The method of claim 35 further comprising repartitioning said plurality of interfaces among said v-net domains, such that said host router is reconfigured.

37. The method of claim 36 wherein during said reconfiguring network traffic is removed from said interfaces that are repartitioned.

38. The method of claim 35 wherein said interface contains the unique domain index number of said v-net domain with which said interface is associated.

39. The method of claim 38 wherein said interface is an interface port of said host router.

40. The method of claim 39 wherein said host router comprises at least 320 said interface ports.

41. The method of claim 39 wherein said process creates a socket, such that said socket is associated permanently and exclusively with the v-net domain in which it is created and containing said unique domain index number of said domain in which it is created.

42. The method of claim 41 wherein multiple sockets are created by at least one said process in at least one said v-net domain, such that each of said multiple sockets is associated permanently and exclusively with the v-net domain in which said socket is created.

43. The method of claim 42 further comprising moving said at least one process from one said v-net domain to a different said v-net domain, such that said at least one process creates a said socket in each of at least two said v-net domains.

44. The method of claim 42 wherein said process maintains a file descriptor table containing pointers to said sockets associated with said v-net domain.

45. The method of claim 44 wherein a particular socket associated with a particular v-net domain is applied exclusively to live traffic networking independently of any other said v-net domain of said host router.

46. The method of claim 44 wherein a particular socket associated with a particular v-net domain is applied exclusively to a test bed operation independently of any other said v-net domain of said host router.

47. The method of claim 41 wherein each of said v-net domains maintains an independent routing table.

48. The method of claim 47 wherein each said socket uses the routing table of said v-net domain in which said socket is created.

49. The method of claim 47 wherein said two distinct v-net domains use the same Internet Protocol (IP) addresses without conflicting.

50. The method of claim 47 wherein one particular v-net domain within said host router contains routing tables exclusively for internal interface addresses within said host router independently of any other said v-net domain of said host router.

51. The method of claim 47 wherein a particular v-net domain within said host router contains routing tables exclusively for interfaces externally visible from outside said host router independently of any other said v-net domain of said host router.

52. The method of claim 47 wherein a failure of one of said plurality of said v-net domains does not adversely affect a different one of said plurality of said v-net domains.

* * * * *